US012228099B2

(12) United States Patent
Fukui et al.

(10) Patent No.: US 12,228,099 B2
(45) Date of Patent: Feb. 18, 2025

(54) AIR CLEANER

(71) Applicant: SUZUKI MOTOR CORPORATION, Hamamatsu (JP)

(72) Inventors: Akihito Fukui, Hamamatsu (JP); Shintaro Yagi, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 107 days.

(21) Appl. No.: 17/983,171

(22) Filed: Nov. 8, 2022

(65) Prior Publication Data

US 2023/0151785 A1 May 18, 2023

(30) Foreign Application Priority Data

Nov. 15, 2021 (JP) ................................ 2021-185548

(51) Int. Cl.
*F02M 35/08* (2006.01)
*F02M 35/02* (2006.01)
*F02M 35/16* (2006.01)

(52) U.S. Cl.
CPC ...... *F02M 35/088* (2013.01); *F02M 35/0201* (2013.01); *F02M 35/162* (2013.01)

(58) Field of Classification Search
CPC ............ F02M 35/088; F02M 35/0201; F02M 35/162; F02M 35/0203; F02M 35/0204; F02M 35/02416; F02M 35/02491; F02M 35/048
See application file for complete search history.

(56) References Cited

U.S. PATENT DOCUMENTS 4,796,719 A * 1/1989 Shiratsuchi ........... B60K 13/02 180/219
2015/0274254 A1* 10/2015 Yamashita ............ B62K 11/04 180/219

FOREIGN PATENT DOCUMENTS

JP 4121392 B2 7/2008

* cited by examiner

*Primary Examiner* — Jacob M Amick
*Assistant Examiner* — Charles J Brauch
(74) *Attorney, Agent, or Firm* — Stein IP, LLC

(57) ABSTRACT

There is provided an air cleaner configured to be disposed inside a vehicle body frame, the air cleaner including: an air cleaner case in which an intake chamber is formed; an air filter disposed in the intake chamber; an inlet tube configured to take in air to the intake chamber; and an outlet tube configured to send out the air from the intake chamber. The inlet tube extends in a front-rear direction. The inlet tube has a bottom wall curved downward in a side view to form a concave curved portion below a discharge port of the inlet tube. The concave curved portion is formed with a drain hole.

6 Claims, 10 Drawing Sheets

AIR CLEANER

CROSS-REFERENCE TO RELATED APPLICATIONS

This application is based on Japanese Patent Application No. 2021-185548 filed on Nov. 15, 2021, the contents of which are incorporated herein by way of reference.

TECHNICAL FIELD

The present invention relates to an air cleaner.

BACKGROUND

There has been a straddle-type vehicle in which an air cleaner is disposed behind an engine (for example, see Patent Literature 1). In the air cleaner disclosed in Patent Literature 1, an inlet tube is attached to a rear surface of an air cleaner case, and an outlet tube is attached to a front surface of the air cleaner case. Air is taken into the air cleaner case from the inlet tube, and the air is filtered by an air filter disposed in the air cleaner. Then, the clean air enters the outlet tube from the air cleaner, and the clean air is sent out to a throttle body through the outlet tube.

Patent Literature 1: JP4121392B

The air cleaner described in Patent Literature 1 is disposed below the seat, and a suction port of the inlet tube is open to the inside of the vehicle body frame. In order to improve the flow of air, it is necessary to increase the opening area of the suction port of the inlet tube. However, when water intrudes into the air cleaner from the suction port and the air filter is moistened by the water, the air flow may be deteriorated. Although it is conceivable to suppress the intrusion of water by bending the inlet tube, bending of the inlet tube may be steep due to the narrow space inside the vehicle body frame, which increases the intake resistance.

The present invention has been made in view of the above, and an object of the present invention is to provide an air cleaner capable of smoothly flowing air while suppressing adhesion of water to an air filter.

SUMMARY

An air cleaner according to an aspect of the present invention is an air cleaner configured to be disposed inside a vehicle body frame, the air cleaner including: an air cleaner case in which an intake chamber is formed: an air filter disposed in the intake chamber; an inlet tube configured to take in air to the intake chamber; and an outlet tube configured to send out the air from the intake chamber. The inlet tube extends in a front-rear direction. The inlet tube has a bottom wall curved downward in a side view to form a concave curved portion below a discharge port of the inlet tube. The concave curved portion is formed with a drain hole.

DESCRIPTION OF EMBODIMENTS

An air cleaner according to an aspect of the present invention is disposed inside a vehicle body frame. An intake chamber is formed in an air cleaner case of the air cleaner, and an air filter is disposed in the intake chamber. Air is taken into the intake chamber through an inlet tube, and air is sent out from the intake chamber through an outlet tube. The inlet tube extends in a front-rear direction, and the inlet tube has a bottom wall curved downward in a side view to form a concave curved portion. The concave curved portion is located below the discharge port of the inlet tube, and water intruding the inlet tube is blocked by the concave curved portion and is less likely to head for the air filter of the intake chamber. The concave curved portion is formed with a drain hole. Water in the inlet tube is likely to gather in the drain hole due to the concave curved portion, and water can be drained from the inside of the inlet tube through the drain hole. In addition, the concave curved portion of the inlet tube does not interfere with the flow of air from the inlet tube toward the air filter. Therefore, even if the opening area of the suction port of the inlet tube is increased, the adhesion of water to the air filter is suppressed, and the air in the air cleaner can flow smoothly.

Embodiments

Figure 1:
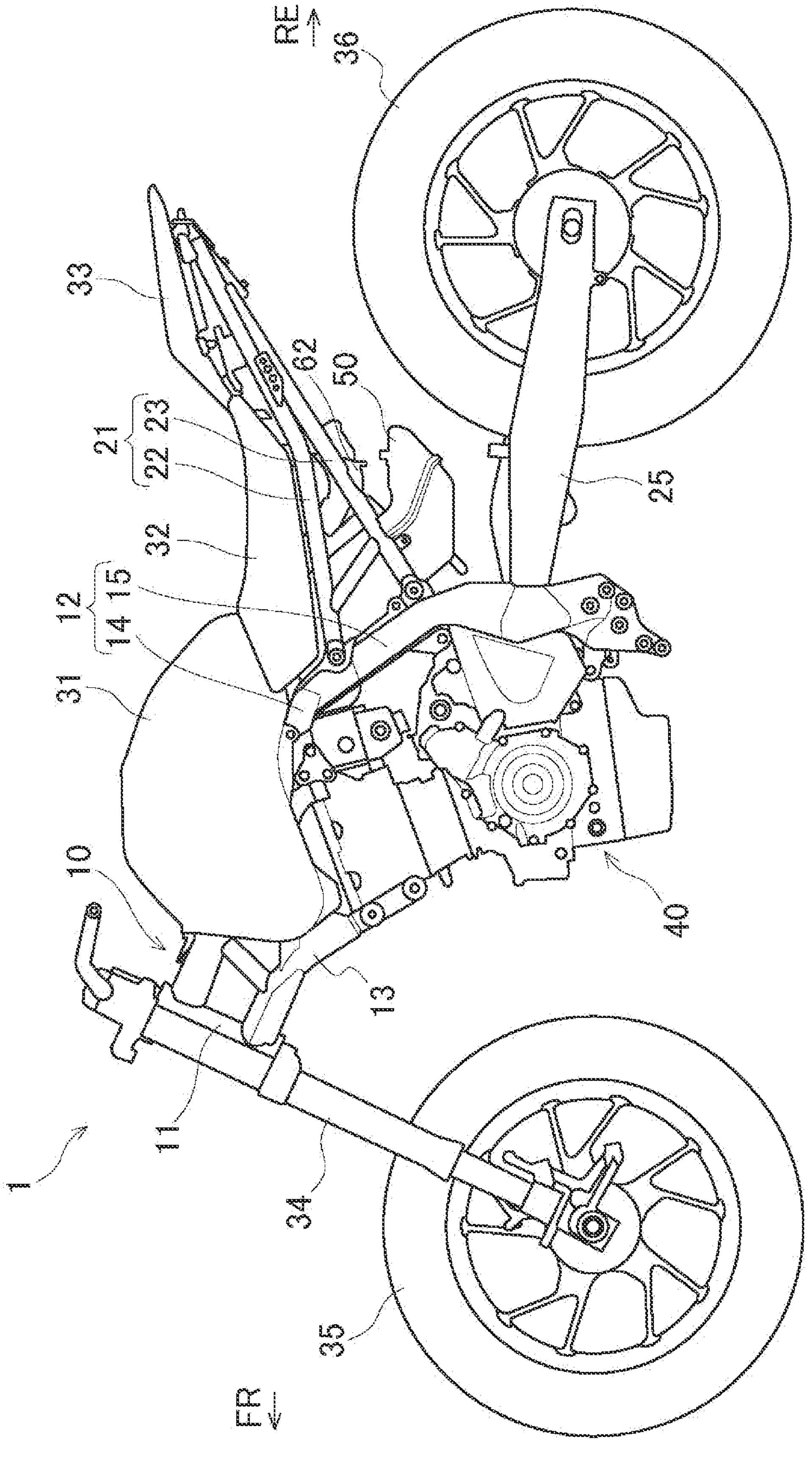
FIG. 1 is a left side view of a straddle-type vehicle according to the present embodiment.

Hereinafter, an embodiment will be described in detail with reference to the accompanying drawings. FIG. 1 is a left side view of a straddle-type vehicle according to the present embodiment. In addition, in the drawings to be described later, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 is formed by mounting various components such as an engine 40 and an electrical system on a diamond-type vehicle body frame 10 formed of a pipe and a sheet metal. The vehicle body frame 10 includes a pair of main frames 12 that are branched off from a head pipe 11 to the left and right and extend rearward, and a pair of down frames 13 that are branched off from the head pipe 11 to the left and right and extend downward. A rear portion of the engine 40 is supported by the pair of main frames 12, and a front portion of the engine 40 is supported by the pair of down frames 13. By supporting the engine 40 with the vehicle body frame 10, the rigidity of an entire vehicle is secured.

A front side portion of the main frame 12 is a tank rail 14 located above the engine 40, and a fuel tank 31 is supported from below by the tank rail 14. A rear side portion of the main frame 12 is a body frame 15 located behind the engine 40, and a swing arm 25 is swingably supported by a lower half portion of the body frame 15. A seat rail 21 including an upper rail 22 and a lower rail 23 is attached to an upper half portion of the body frame 15. A rider seat 32 and a pillion seat 33 are supported on an upper portion of the upper rail 22 at the rear of the fuel tank 31.

A pair of front forks 34 are steerably supported by the head pipe 11 via a steering shaft (not shown). A front wheel 35 is rotatably supported by lower portions of the front forks 34, and an upper portion of the front wheel 35 is covered with a front fender (not shown). The swing arm 25 extends rearward from the body frame 15. A rear wheel 36 is rotatably supported at a rear end of the swing arm 25, and the upper side of the rear wheel 36 is covered with a rear fender (not shown). The engine 40 is coupled to the rear wheel 36 via a chain drive type transmission mechanism, and power from the engine 40 is transmitted to the rear wheel 36 via the transmission mechanism.

An air cleaner 50 is disposed behind the engine 40, and an inlet tube 62 of the air cleaner 50 extends rearward. In order to enlarge the suction port of the inlet tube 62 to improve the flow of air in the air cleaner 50, it is necessary to suppress intrusion of water into the air cleaner 50 so that the air filter 57 (see FIG. 6) is not moistened. In a narrow space behind the engine 40, it is difficult to direct the orientation of the suction port to the upper side, the lateral side, or the like to suppress the intrusion of water from the rear of the vehicle. Therefore, in the air cleaner 50 of the present embodiment, an inlet tube 62 capable of capturing and draining water heading for the air filter 57 without interrupting the flow of air is used.

Figure 2:
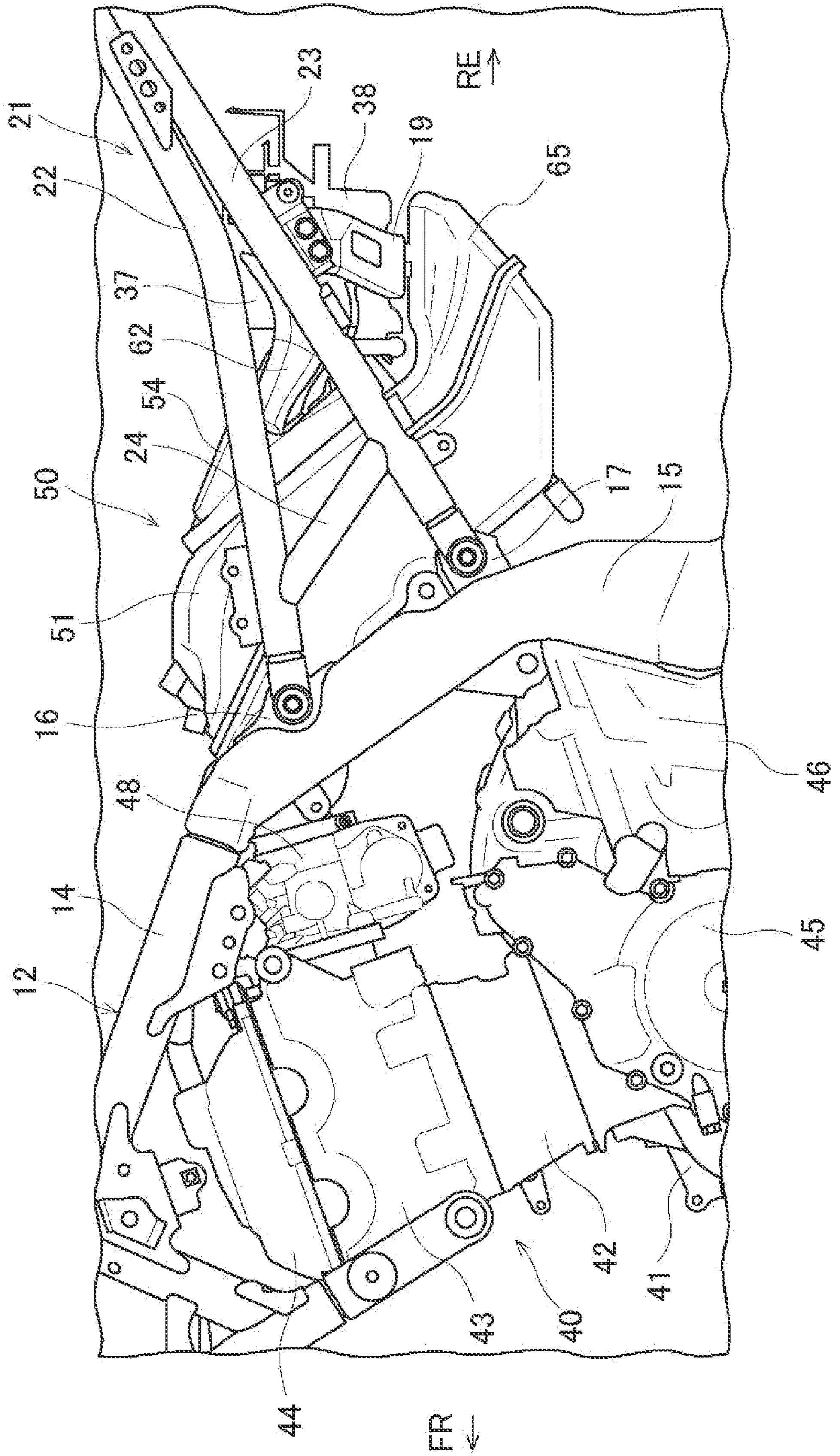
FIG. 2 is a left side view of the periphery of an engine according to the present embodiment.
Figure 3:
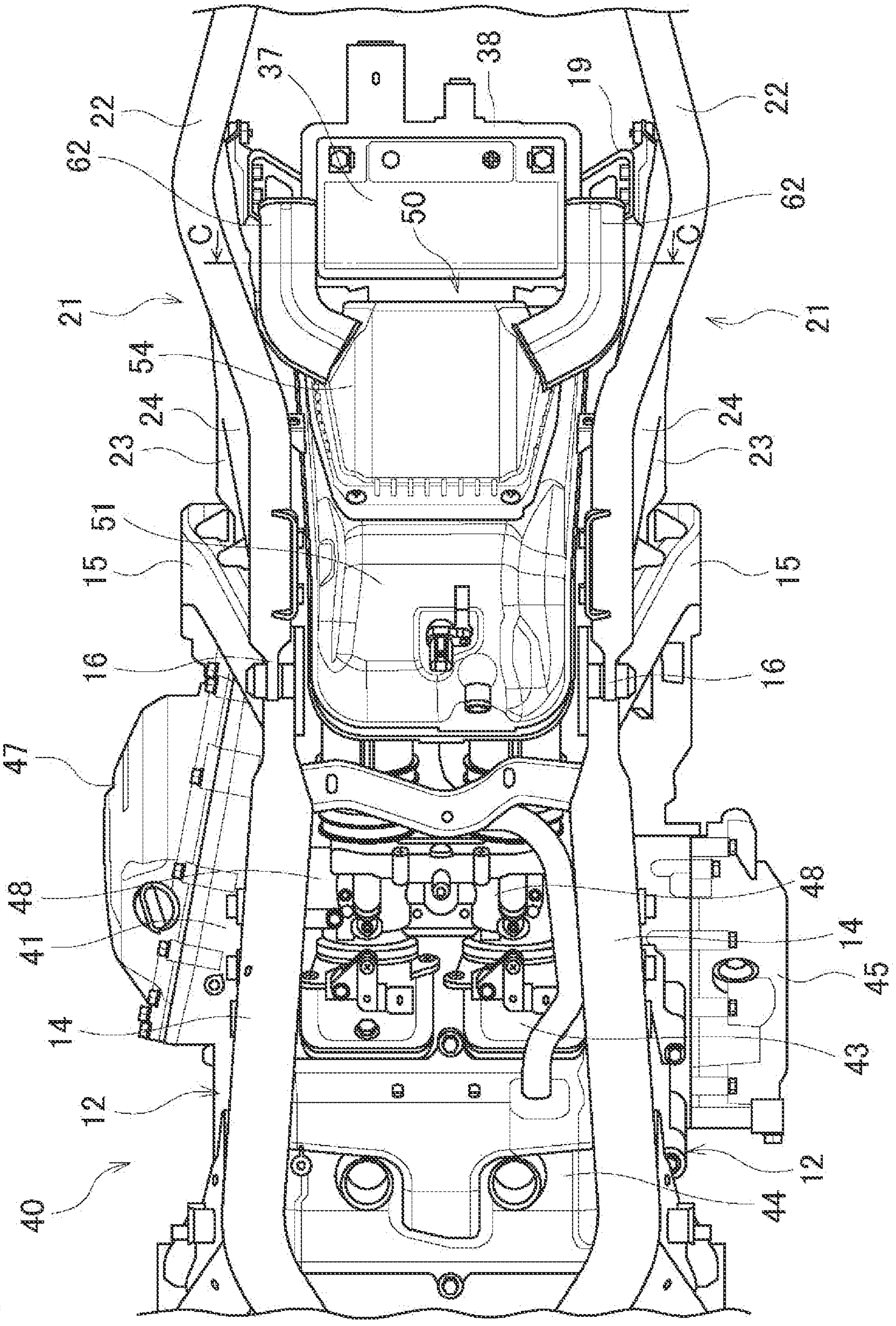
FIG. 3 is a top view of the periphery of the engine according to the present embodiment.
Figure 4:
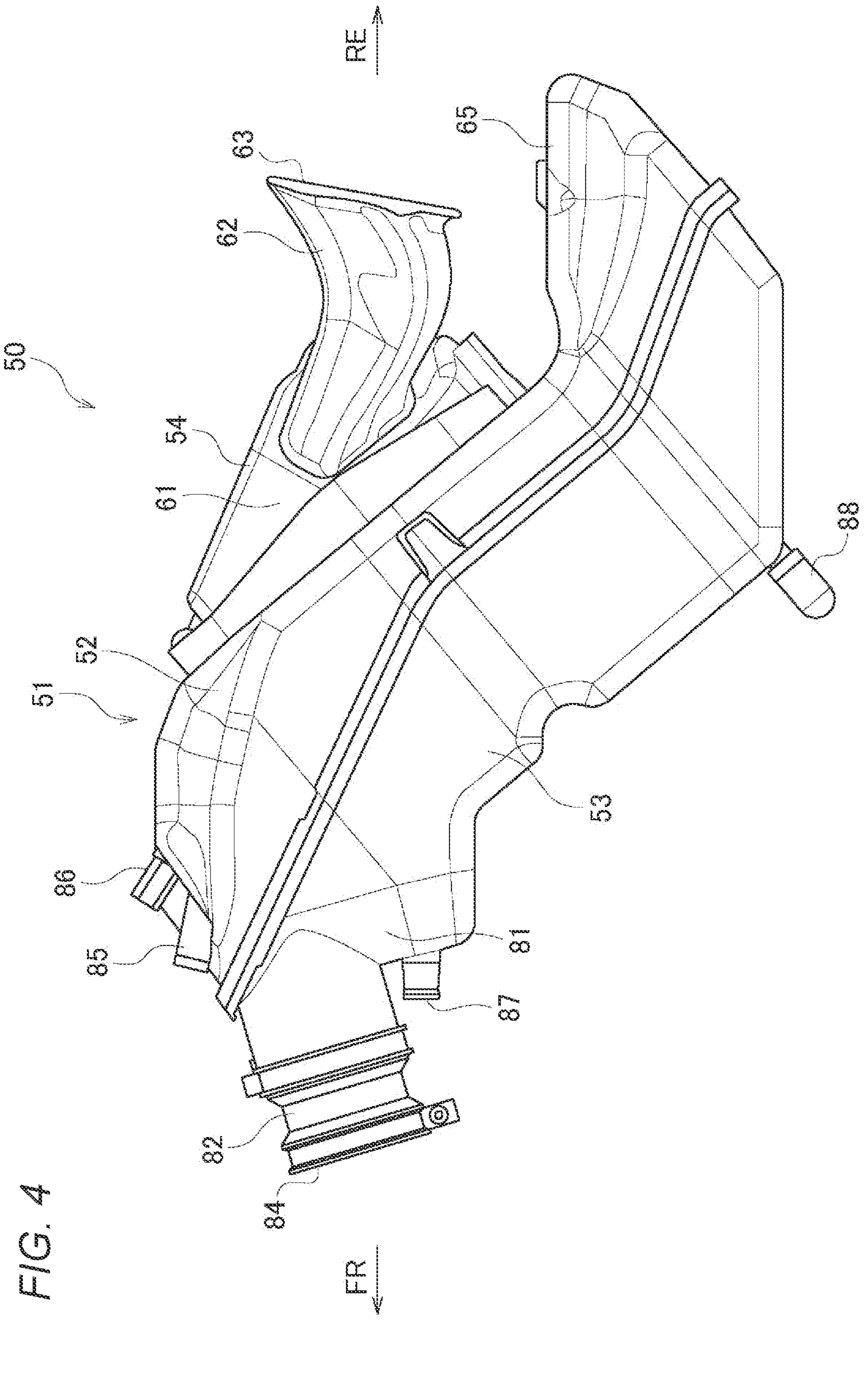
FIG. 4 is a side view of an air cleaner according to the present embodiment.
Figure 5:
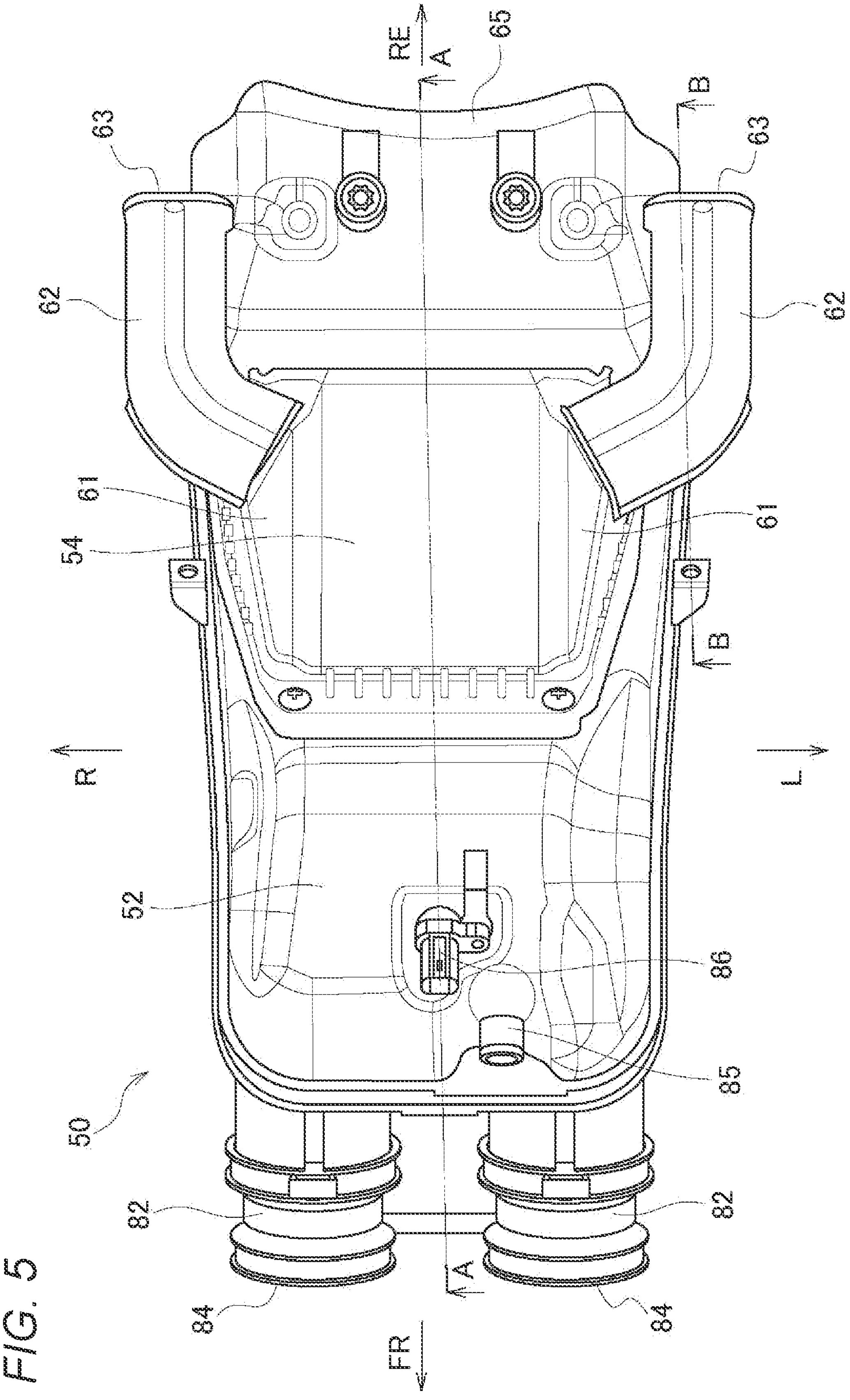
FIG. 5 is a top view of the air cleaner of the present embodiment.
Figure 6:
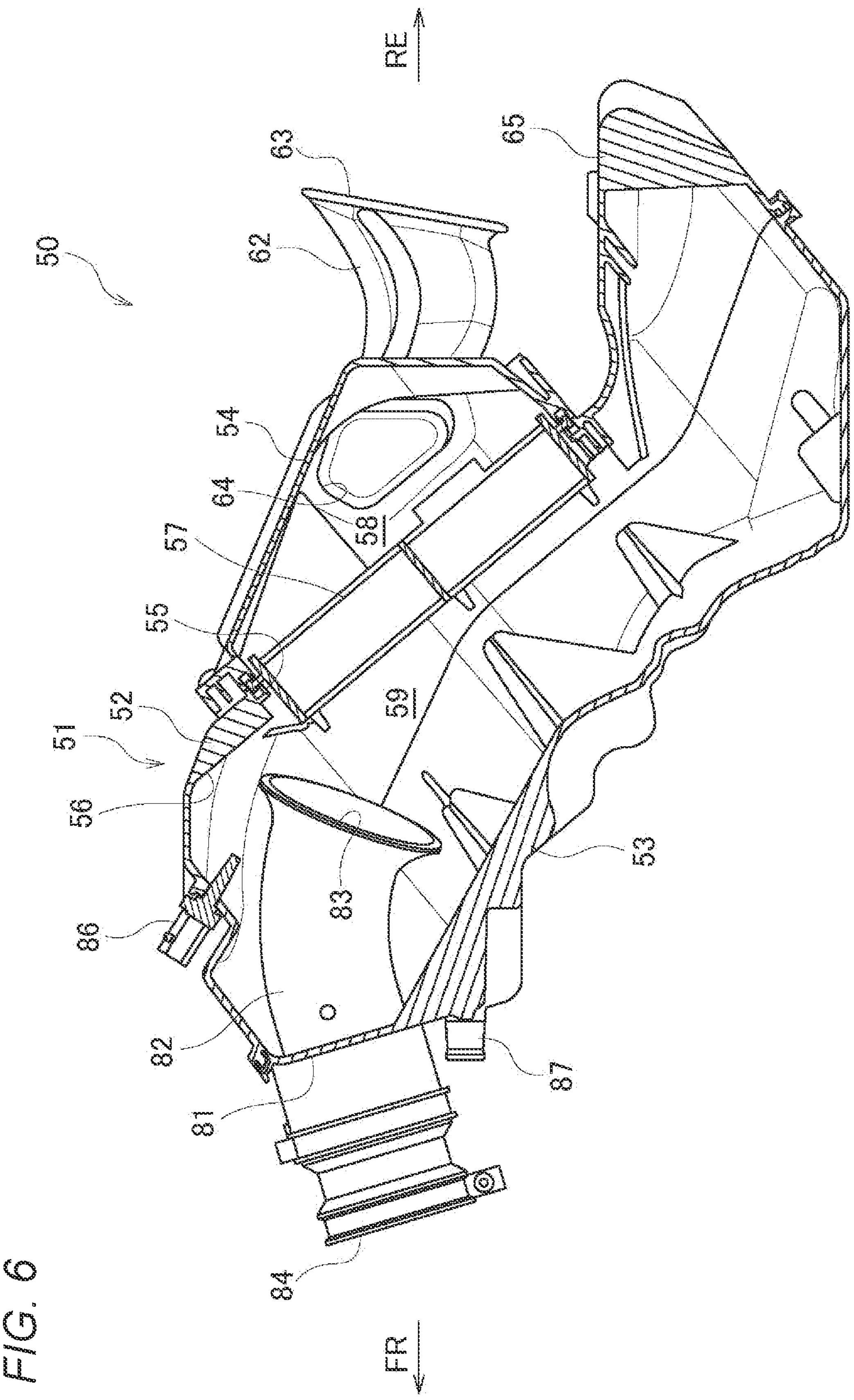
FIG. 6 is a cross-sectional view of the air cleaner of FIG. 5 taken along a line A-A.
Figure 7:
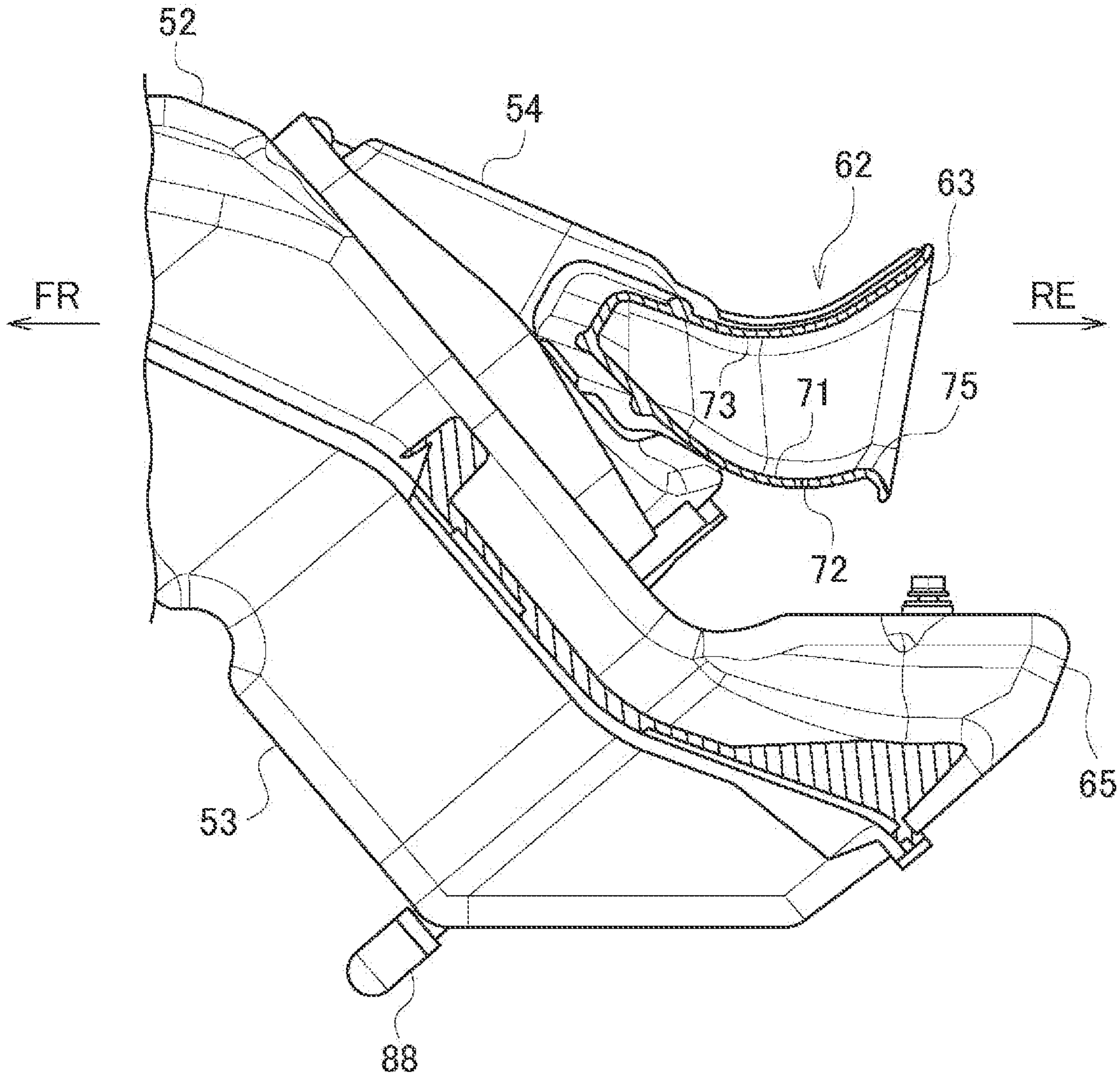
FIG. 7 is a cross-sectional view of the air cleaner of FIG. 5 taken along a line B-B.
Figure 8:
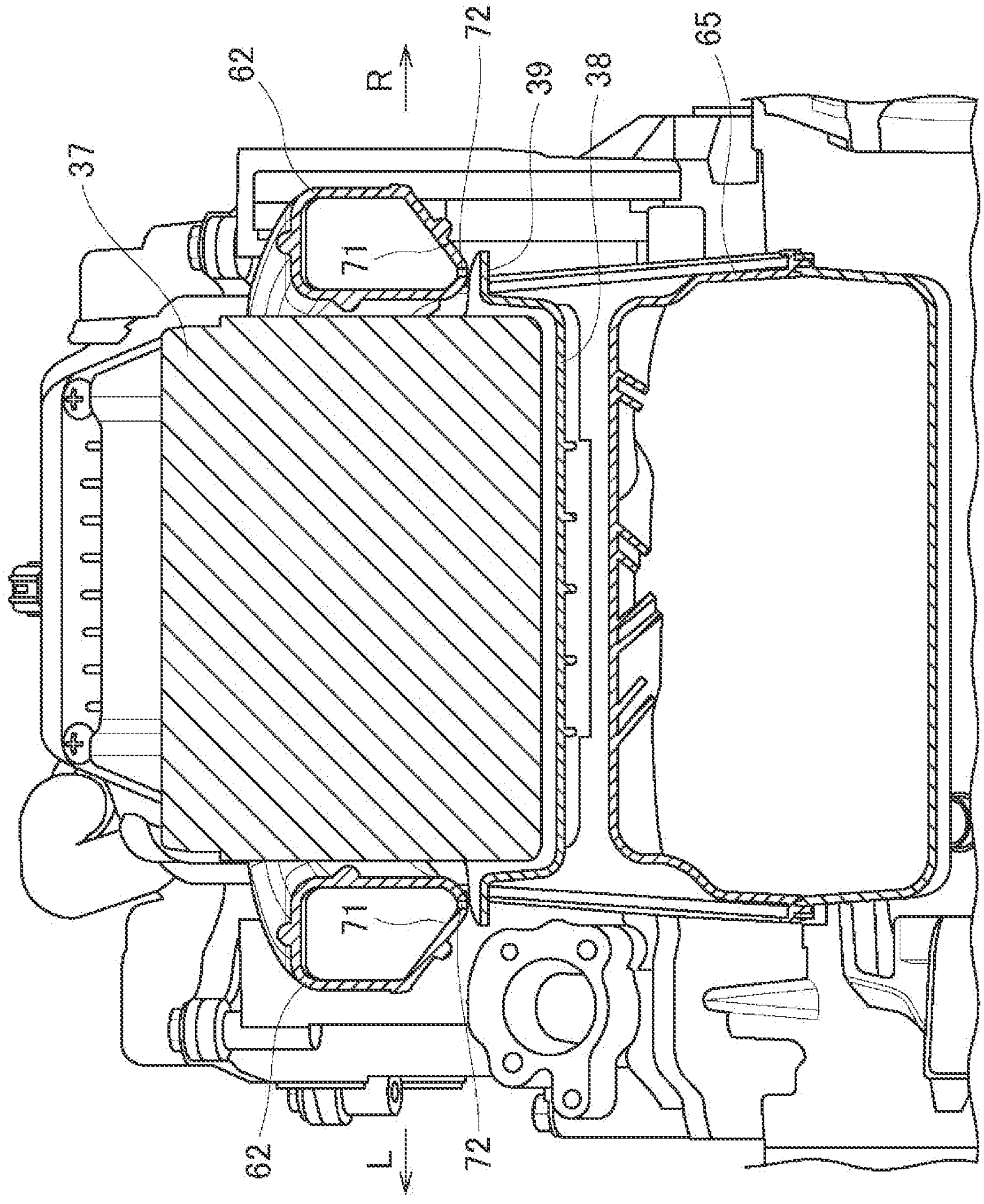
FIG. 8 is a cross-sectional view of the periphery of the engine of FIG. 3 taken along a line C-C.

A peripheral configuration of the engine and the air cleaner will be described with reference to FIGS. 2 to 8. FIG. 2 is a left side view of the periphery of the engine according to the present embodiment. FIG. 3 is a top view of the periphery of the engine according to the present embodiment. FIG. 4 is a side view of the air cleaner according to the present embodiment. FIG. 5 is a top view of the air cleaner according to the present embodiment. FIG. 6 is a cross-sectional view of the air cleaner of FIG. 5 taken along a line A-A. FIG. 7 is a cross-sectional view of the air cleaner of FIG. 5 taken along a line B-B. FIG. 8 is a cross-sectional view of the periphery of the engine of FIG. 3 taken along a line C-C.

As shown in FIGS. 2 and 3, the engine 40 is a two-cylinder engine, and includes a crankcase 41 having an upper-lower divided structure. A cylinder 42, a cylinder head 43, and a cylinder head cover 44 are attached to an upper portion of the crankcase 41. A magneto cover 45 that covers a magneto (not shown) from a side is attached to a left side surface of the crankcase 41. A sprocket cover 46 that covers a drive sprocket (not shown) from the side is attached to the rear of the magneto cover 45. A clutch cover 47 that covers a clutch (not shown) from the side is attached to a right side surface of the crankcase 41.

A throttle body 48 is connected to a rear surface of the cylinder head 43, and the air cleaner 50 is connected to an upstream side (rear side) of the throttle body 48. The air cleaner 50 is disposed behind the engine 40 and inside the pair of main frames 12 and the pair of seat rails 21. As described above, the rear portions of the pair of main frames 12 are the pair of body frames 15, and a front end portion of the air cleaner 50 is located inside the pair of body frames 15. The upper half portion of the body frame 15 is inclined obliquely downward toward the rear, and an air cleaner case 51 behind the body frame 15 is also inclined obliquely downward.

An upper bracket 16 and a lower bracket 17 are formed at a rear edge of the upper half portion of the body frame 15. The upper rail 22 of the seat rail 21 is connected to the upper bracket 16, and the lower rail 23 of the seat rail 21 is connected to the lower bracket 17. The upper rail 22 extends rearward across a side of an upper half portion of the air cleaner case 51, and the lower rail 23 extends obliquely rearward across a side of a lower half portion of the air cleaner case 51. Front sides of the upper rail 22 and the lower rail 23 are coupled to each other via a bridge pipe 24, and rear sides of the upper rail 22 and the lower rail 23 are coupled to each other at a vehicle rear portion.

A front portion of the air cleaner case 51 protrudes upward from the upper rail 22, and a protruding portion of the front portion is accommodated in a space inside the rider seat 32 (see FIG. 1). A rear portion of the air cleaner case 51 protrudes downward from the lower rail 23, and a protruding portion of the rear portion serves as an expansion portion 65 that expands an intake chamber 56 (see FIG. 6) in the air cleaner case 51. The expansion portion 65 of the air cleaner case 51 is located above the swing arm 25 (see FIG. 1), and the expansion portion 65 extends rearward so as to avoid a swing range of the swing arm 25. A volume of the air cleaner case 51 is expanded by using a lower space of the seat rail 21.

A battery case 38 and a battery 37 are disposed above the expansion portion 65 of the air cleaner case 51. The battery case 38 is supported by the pair of seat rails 21 via a bridge 19. The battery case 38 is formed in a box shape having an open upper surface, and a rectangular parallelepiped battery 37 is held inside the battery case 38. In a top view, the pair of inlet tubes 62 of the air cleaner 50 are curved, and the battery 37 is located between the pair of inlet tubes 62. A space for arranging the battery 37 is secured by using a space above the expansion portion 65 of the air cleaner 50.

As shown in FIGS. 4 to 6, the air cleaner case 51 of the air cleaner 50 includes an upper case 52 and a lower case 53 which are divided in an upper-lower direction, and a filter cover 54 attached to a rear surface of the upper case 52. The upper case 52 and the lower case 53 extend obliquely downward from the front to the rear, and the filter cover 54 bulges in a dome shape on a rear side of the upper case 52. Internal spaces of the upper case 52 and the lower case 53 and an internal space of the filter cover 54 are connected to each other through an opening 55 formed in the rear surface of the upper case 52, and an intake chamber 56 is formed inside the air cleaner case 51.

An air filter 57 is disposed in the opening 55 in the rear surface of the upper case 52, and the air filter 57 is covered by the filter cover 54 from behind. The air filter 57 is inclined along an upper surface of the upper case 52 such that an upper portion of the air filter 57 is located closer to the vehicle front side than a lower portion. Due to the air filter 57, the intake chamber 56 is divided into a dirty side 58 and a clean side 59. That is, the dirty side 58 is formed by the filter cover 54 on the upstream side of the air filter 57, and the clean side 59 is formed by the upper case 52 and the lower case 53 on the downstream side of the air filter 57.

A pair of inlet tubes 62 are attached to left and right side walls 61 of the filter cover 54. The pair of inlet tubes 62 extend from the left and right side walls 61 of the filter cover 54 toward the vehicle rear side, and air is taken into the dirty side 58 from the rear of the vehicle by the pair of inlet tubes 62. A suction port 63 of each inlet tube 62 is directed toward the rear of the vehicle, and a discharge port 64 of the inlet tube 62 is directed inward in the vehicle width direction. The pair of inlet tubes 62 are located inside the pair of seat rails 21 (see FIG. 3), and an interval between the pair of inlet tubes 62 is substantially equal to a lateral width of the expansion portion 65.

A pair of outlet tubes 82 are attached to a front wall 81 of the lower case 53. The pair of outlet tubes 82 penetrate the front wall 81 of the lower case 53 and extend in a front-rear direction, and air is sent out from the clean side 59 to the engine 40 (see FIG. 1) by the pair of outlet tubes 82. A suction port 83 of each outlet tube 82 is directed toward the rear of the vehicle, and a discharge port 84 of the outlet tube 82 is directed toward the front of the vehicle. The pair of outlet tubes 82 are located inside the pair of main frames 12 (see FIG. 3), and the pair of outlet tubes 82 are connected to a pair of intake passages of the throttle body 48.

The inlet tubes 62 and the outlet tubes 82 are attached to the upper side of the air cleaner case 51. As described above, the inlet tubes 62 are attached to the filter cover 54, the outlet tubes 82 are attached to the front wall 81 of the lower case 53, and the filter cover 54 and the front wall 81 of the lower case 53 face each other in the front-rear direction via the air filter 57 in a side view. Since the discharge port 64 of each inlet tube 62 and the suction port 83 of each outlet tube 82 are located at substantially the same height, air easily flows directly from the inlet tube 62 to the outlet tube 82.

In addition, a breather nipple 85 is formed at a front portion of the upper case 52, and a breather hose (not shown) extending from the engine 40 is connected to the breather nipple 85. An intake air temperature sensor 86 is attached to the vicinity of the breather nipple 85, and a detection result of the intake air temperature sensor 86 is used for fuel injection amount control with respect to the engine 40 (see FIG. 1). A secondary air nipple 87 is formed at a front portion of the lower case 53, and a secondary air hose (not shown) extending to an exhaust system is connected to the secondary air nipple 87. A drain plug 88 is provided at the bottom portion of the lower case 53, and water in the air cleaner case 51 is discharged from the drain plug 88.

As shown in FIG. 7, the bottom wall and the upper wall of each inlet tube 62 are curved in a manner warped downward. The bottom wall of the inlet tube 62 is curved downward to form a concave curved portion 71 below the discharge port 64, and the upper wall of the inlet tube 62 is curved downward to form a convex curved portion 73. The lowest position of the concave curved portion 71 is located below a lower edge of the discharge port 64 (see FIG. 6) of the inlet tube 62, and the lowest position of the convex curved portion 73 is located below an upper edge of the discharge port 64 of the inlet tube 62. The air in the inlet tube 62 smoothly flows toward the discharge port 64, but water adhering to the wall surface of the inlet tube 62 is less likely to flow toward the discharge port 64.

A drain hole 72 penetrating the bottom wall of the inlet tube 62 is formed in the concave curved portion 71, and water captured by the concave curved portion 71 is likely to gather in the drain hole 72. The convex curved portion 73 is located above the drain hole 72. Water captured by the convex curved portion 73 falls into the concave curved portion 71, and water is likely to gather in the drain hole 72. Water is discharged through the drain hole 72, which improves the drainage performance of the inlet tube 62. Since water intruding the inlet tube 62 is less likely to head for the air filter 57 (see FIG. 6), the adhesion of water to the air filter 57 is suppressed, and the air flow in the air cleaner 50 is smooth.

At this time, the concave curved portion 71 and the convex curved portion 73 are curved at a curvature that does not interfere with the flow of the air from the suction port 63 toward the discharge port 64, and the intake resistance of the inlet tube 62 does not significantly increase due to the concave curved portion 71 and the convex curved portion 73. Although some of the air flows out from the inlet tube 62 through the drain hole 72, the drain hole 72 is formed with an inner diameter small enough so as not to excessively affect the flow of the air from the suction port 63 toward the discharge port 64. In addition, the suction port 63 of the inlet tube 62 is formed to be larger than the discharge port 64, and air is likely to enter the inlet tube 62 from the suction port 63.

The suction port 63 of the inlet tube 62 has a lower edge located below the drain hole 72. The bottom wall of the inlet tube 62 protrudes upward between the drain hole 72 and the lower edge of the suction port 63 to form a convex portion 75. The convex portion 75 is curved in a manner warped upward in the vicinity of the lower edge of the suction port 63, and even if the opening area of the suction port 63 of the inlet tube 62 is increased, intrusion of water is hindered by the convex portion 75 in the vicinity of the suction port 63. When water is captured by the convex portion 75 in the vicinity of the suction port 63 of the inlet tube 62, some of the water moves from the convex portion 75 toward the concave curved portion 71, and water gathers in the drain hole 72, which improves the drainage performance of the inlet tube 62.

Further, as in the present embodiment, when the air cleaner 50 is disposed inside the pair of seat rails 21 where the height is limited, the positions of the air filter 57 (see FIG. 6) and the discharge port 64 of the inlet tube 62 cannot be shifted in the height direction. Therefore, the drain hole 72 of the inlet tube 62 is located below the center of the air filter 57 in the height direction. Even when water accumulated in the concave curved portion 71 moves toward the discharge port 64 (see FIG. 6) together with the flow of air, water hardly adheres to a position higher than the center of the air filter 57 in the height direction. Therefore, water totally does not adhere to the air filter 57, and the air flow is not hindered by the moistened air filter 57.

As shown in FIG. 8, in a cross-sectional view orthogonal to the extending direction of the inlet tube 62, the inlet tube 62 has a cross-sectional shape of a right-angled trapezoid with an acute-angled portion facing downward. The acute-angled portion of the right-angled trapezoid is located on the inner side in the vehicle width direction, and due to the acute-angled portion of the right-angled trapezoid, the bottom wall of the concave curved portion 71 is formed in a valley shape. The drain hole 72 is formed in the valley bottom of the concave curved portion 71, and water gathers in the drain hole 72 due to the valley shape of the concave curved portion 71, thereby improving the drainage performance of the inlet tube 62. In the side view and the cross-sectional view, the drain hole 72 is formed at the lowest position of the concave curved portion 71.

The battery 37 is located on the inner side in the vehicle width direction of the inlet tubes 62. As described above, the battery 37 is held by the box-shaped battery case 38. Flanges 39 extend outward in the vehicle width direction from an outer edge of the battery case 38, and each flange 39 is located below the drain hole 72 of the inlet tube 62. The inlet tube 62 and the flange 39 face each other with a slight gap therebetween, and the drain hole 72 of the inlet tube 62 is covered from the lower side by the flange 39. An intrusion path into the drain hole 72 is blocked by the flange 39, thereby suppressing intrusion of water from the drain hole 72 into the inlet tube 62.

Figure 9A:
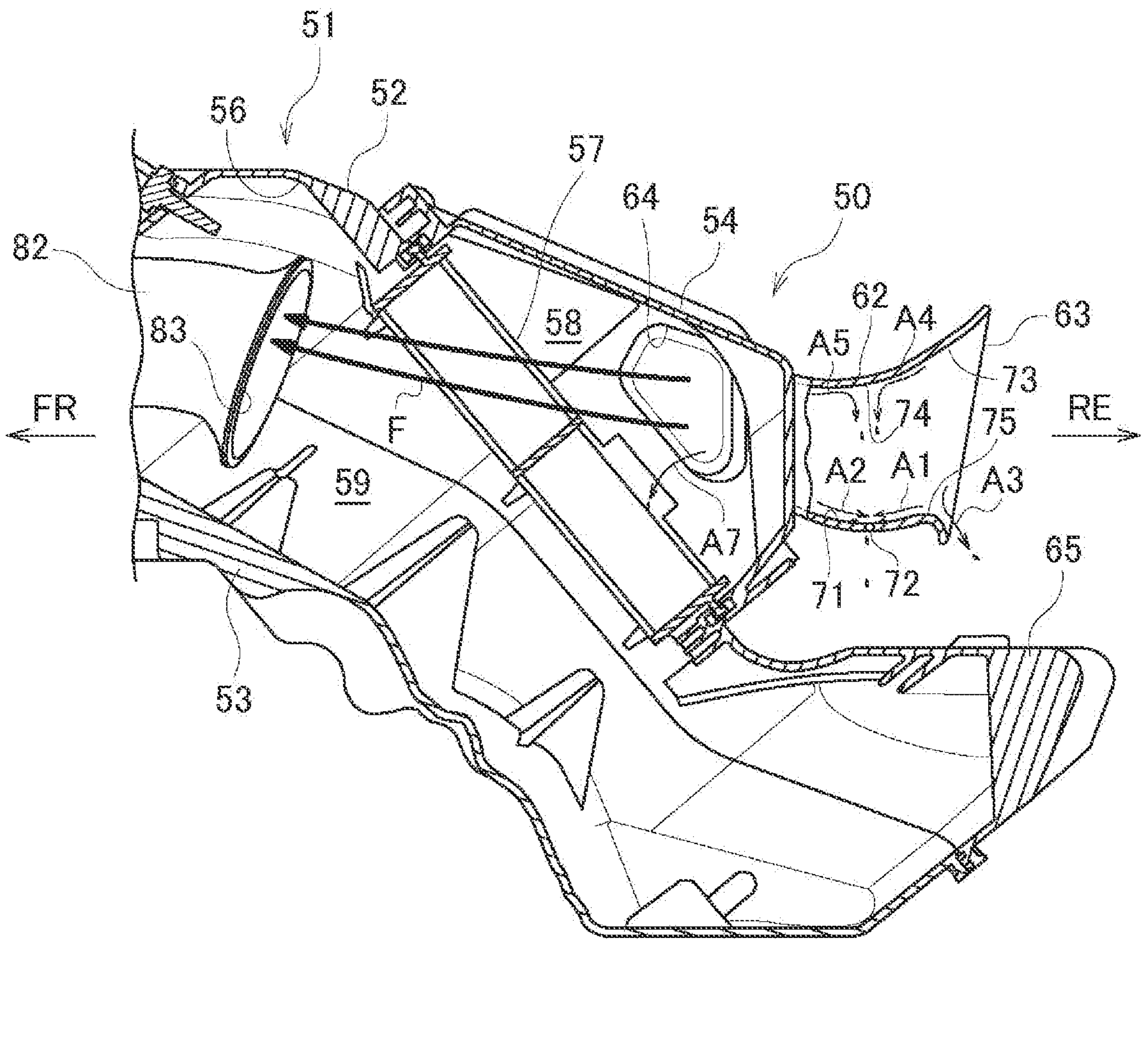
FIGS. 9A and 9B are diagrams showing a flow of air and water in the air cleaner according to the present embodiment.
Figure 9B:
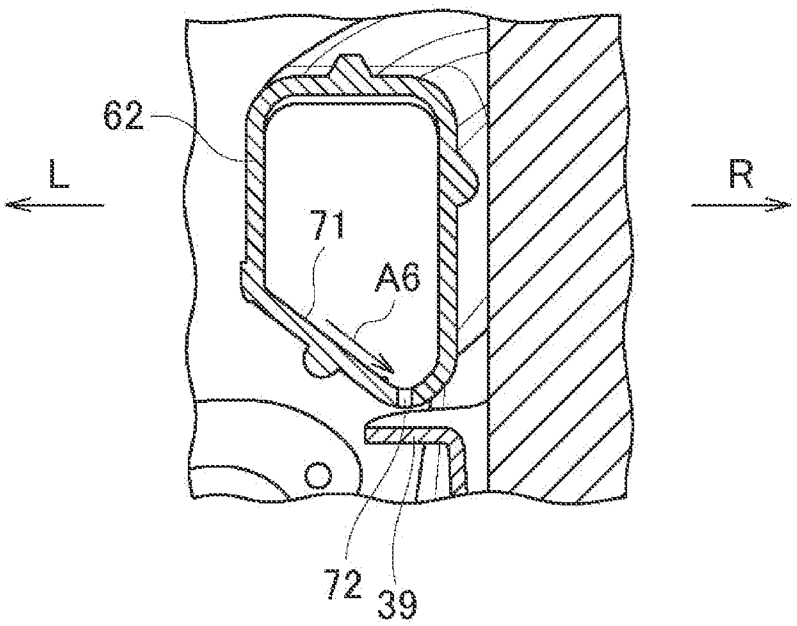

The flow of air and water in the air cleaner will be described with reference to FIGS. 9A and 9B. FIGS. 9A and 9B are diagrams showing the flow of air and water in the air cleaner according to the present embodiment. FIG. 9A is a side view of the flow of air and water in the air cleaner, and FIG. 9B is a rear view of the flow of air and water in the air cleaner.

As shown in FIG. 9A, the upper portion of the air filter 57 is inclined so as to be closer to the vehicle front side than the lower portion in a side view. The discharge port 64 of the inlet tube 62 faces the center of the front surface of the air filter 57, and the suction port 83 of the outlet tube 82 faces the upper portion of the back surface of the air filter 57. Since the center of the front surface and the upper portion of the back surface of the inclined air filter 57 have substantially the same height, the discharge port 64 of the inlet tube 62 and the suction port 83 of the outlet tube 82 face each other with the air filter 57 interposed therebetween. The suction port 63 of the inlet tube 62 is formed wide, and air can be easily taken in from the suction port 63.

The bottom wall of the inlet tube 62 is formed with the concave curved portion 71, and the upper wall of the inlet tube 62 is formed with the convex curved portion 73. The concave curved portion 71 and the convex curved portion 73 are curved gently, so that even when the air is taken into the suction port 63 of the inlet tube 62, the flow of air is not hindered by the curved shapes of the concave curved portion 71 and the convex curved portion 73. Therefore, the air smoothly flows from the suction port 63 of the inlet tube 62 toward the discharge port 64. In rainy weather or the like, water is taken into the suction port 63 of the inlet tube 62 together with air, but water is captured by the curved shapes of the concave curved portion 71 and the convex curved portion 73.

In the bottom wall of the inlet tube 62, the upstream side of the concave curved portion 71 from the convex portion 75 to the drain hole 72 is a downward slope, and the downstream side of the concave curved portion 71 from the drain hole 72 to the discharge port 64 is an upward slope. When water adheres to the downward slope on the upstream side of the concave curved portion 71, water moves toward the downstream side (front side) from the downward slope toward the drain hole 72 as indicated by the arrow A1. When water adheres to the upward slope on the downstream side of the concave curved portion 71, water moves toward the upstream side (rear side) from the upward slope toward the drain hole 72 as indicated by the arrow A2. In addition, water is less likely to enter the vicinity of the suction port 63 of the inlet tube 62 due to the convex portion 75 as indicated by the arrow A3.

In the upper wall of the inlet tube 62, the upstream side of the convex curved portion 73 from the suction port 63 to a top 74 is a downward slope, and the downstream side of the convex curved portion 73 from the top 74 to the discharge port 64 is an upward slope. When water adheres to the downward slope on the upstream side of the convex curved portion 73, water moves toward the downstream side (front side) from the downward slope toward the top 74 as indicated by the arrow A4. When water adheres to the upward slope on the downstream side of the convex curved portion 73, water moves toward the upstream side (rear side) from the upward slope toward the top 74 as indicated by the arrow A5. In addition, water flows down from the top 74 of the convex curved portion 73 toward the concave curved portion 71, and water moves toward the drain hole 72 of the concave curved portion 71.

As shown in FIG. 9B, in a cross-sectional view orthogonal to the inlet tube 62, the bottom wall of the inlet tube 62 is inclined in a manner descending from the outer side in the vehicle width direction toward the inner side in the vehicle width direction. In the cross-sectional view, the concave curved portion 71 is formed in a V-shaped valley shape, and the drain hole 72 is formed in the valley bottom of the valley shape. Therefore, when water adheres to the inclined surface of the concave curved portion 71, water moves inward in the vehicle width direction from the inclined surface toward the drain hole 72 as indicated by the arrow A6. As indicated by the arrows A1 to A6, water is collected in the drain hole 72 by the concave curved portion 71 and the convex curved portion 73, and water is effectively drained from the inlet tube 62 through the drain hole 72.

As shown in FIG. 9A, the lower edge of the discharge port 64 of the inlet tube 62 is located below the center of the air filter 57 in the height direction. Therefore, even if water flows along the upward slope on the downstream side of the concave curved portion 71 and water is discharged from the discharge port 64 toward the air filter 57, water is less likely to adhere to the upper side of the center of the air filter 57 in the height direction as indicated by the arrow A7. That is, water adheres to the air filter 57 at a position avoiding a main flow F of the air flowing from the discharge port 64 of the inlet tube 62 toward the suction port 83 of the outlet tube 82. Therefore, the main flow F of the air in the air cleaner 50 is not hindered by the moistened air filter 57.

As described above, according to the present embodiment, since the bottom wall and the upper wall of the inlet tube 62 are curved downward, water intruding the inlet tube 62 is less likely to head for the air filter 57 of the intake chamber 56. Water in the inlet tube is likely to gather in the drain hole 72, and water is drained from the inside of the inlet tube through the drain hole 72. In addition, the curved shape of the inlet tube 62 does not interfere with the flow of air from the inlet tube 62 toward the air filter 57. Therefore, even if the opening area of the suction port 63 of the inlet tube 62 is increased, the adhesion of water to the air filter 57 is suppressed, and the air in the air cleaner 50 can flow smoothly.

In the present embodiment, a two-cylinder engine is exemplified as the engine, but the type of the engine is not particularly limited.

In the present embodiment, the air cleaner includes a pair of inlet tubes and a pair of outlet tubes, but the numbers of inlet tubes and outlet tubes are not limited. For example, the air cleaner may include a single inlet tube and a single outlet tube, or the air cleaner may include three or more inlet tubes and three or more outlet tubes.

The convex curved portion is formed on the upper wall of the inlet tube in the present embodiment, but the convex curved portion may be not formed on the upper wall of the inlet tube as long as the concave curved portion is formed at least on the bottom wall of the inlet tube.

In the present embodiment, the inlet tube is formed in a right-angled trapezoidal shape in the cross-sectional view orthogonal to the extending direction of the inlet tube, but the cross-sectional shape of the concave curved portion of the inlet tube may be formed in a valley shape in the cross-sectional view.

In the present embodiment, the drain hole is formed at the lowest position of the concave curved portion of the inlet tube in a side view, but the drain hole may be formed at a position other than the lowest position as long as the drain hole is in the concave curved portion.

In the present embodiment, the air filter is disposed to be inclined, but the air filter may be not inclined. For example, the air filter may be disposed vertically.

In the present embodiment, the drain hole is located below the center of the air filter in the height direction, but the positional relationship in the height direction between the center of the air filter in the height direction and the drain hole is not particularly limited.

In the present embodiment, the convex portion is formed in the vicinity of the suction port of the inlet tube, but the convex portion may be not formed in the inlet tube.

In the present embodiment, the air cleaner case is formed with the expansion portion obtained by expanding the intake chamber, but the air cleaner case may be not provided with the expansion portion. As long as the air cleaner case is formed with an intake chamber, the shape of the air cleaner case is not particularly limited.

In addition, the air cleaner may be applied not only to the straddle-type vehicle shown in the drawings, but also to other types of straddle-type vehicles. The straddle-type vehicle is not limited to general vehicles on which a rider rides in a posture of straddling a seat, and includes a small-sized scooter-type vehicle on which a rider rides without straddling a seat.

As described above, the air cleaner (50) according to the present embodiment is an air cleaner configured to be disposed inside a vehicle body frame (10), the air cleaner including: an air cleaner case (51) in which an intake chamber (56) is formed; an air filter (57) disposed in the intake chamber: an inlet tube (62) configured to take in air to the intake chamber; and an outlet tube (82) configured to send out the air from the intake chamber. The inlet tube extends in a front-rear direction. The inlet tube has a bottom wall curved downward in a side view to form a concave curved portion (71) below a discharge port of the inlet tube. The concave curved portion is formed with a drain hole (72). According to this configuration, since the inlet tube has the bottom wall curved downward to form the concave curved portion below the discharge port (64) of the inlet tube, water intruding the inlet tube is blocked by the concave curved portion and is less likely to head for the air filter of the intake chamber. Water in the inlet tube is likely to gather in the drain hole due to the concave curved portion, and water can be drained from the inside of the inlet tube through the drain hole. In addition, the concave curved portion of the inlet tube does not interfere with the flow of air from the inlet tube toward the air filter. Therefore, even if the opening area of the suction port of the inlet tube is increased, the adhesion of water to the air filter is suppressed, and the air in the air cleaner can flow smoothly.

In the air cleaner of the present embodiment, the inlet tube has an upper wall curved downward in the side view to form a convex curved portion (73), and the drain hole is located below the convex curved portion. According to this configuration, since the upper wall of the inlet tube is curved downward to form the convex curved portion, water intruding the inlet tube is less likely to head for the air filter of the intake chamber. Water adhering to the convex curved portion falls into to the concave curved portion, and water is likely to gather in the drain hole, which further improves the drainage performance.

In the air cleaner of the present embodiment, the drain hole is located below a center of the air filter in a height direction. According to this configuration, even when water accumulated in the concave curved portion moves toward the discharge port together with the flow of air, water hardly adheres to a position higher than the center of the air filter in the height direction. Therefore, water totally does not adhere to the air filter, and the air flow is less likely to be hindered by the moistened air filter.

In the air cleaner of the present embodiment, a suction port (63) of the inlet tube has a lower edge located below the drain hole, and the bottom wall of the inlet tube protrudes upward between the drain hole and the lower edge of the suction port to form a convex portion (75). According to this configuration, even if the opening area of the suction port of the inlet tube is increased, water is less likely to intrude the inner side of the suction port due to the convex portion. In addition, due to the convex portion and the concave curved portion, water is likely to gather in the drain hole, which further improves the drainage performance.

In the air cleaner of the present embodiment, the concave curved portion is formed in a valley shape in the cross-sectional view orthogonal to an extending direction of the inlet tube, and the drain hole is formed in the valley bottom of the concave curved portion. According to this configuration, due to the valley shape of the concave curved portion, water is likely to gather in the drain hole, which further improves the drainage performance.

In the air cleaner of the present embodiment, a battery (37) is located on a lateral side of the inlet tube. The battery is held by a battery case (38). The drain hole is covered from below by a flange (39) on an outer edge of the battery case. According to this configuration, the flanges can suppress water from intruding the inlet tube from the drain hole.

Although the present embodiment has been described, the above-described embodiment and modifications may be combined entirely or partially as another embodiment.

The technique of the present invention is not limited to the above-described embodiment, and various changes, substitutions, and modifications may be made without departing from the spirit of the technical concept of the present invention. The present invention may be implemented by other methods as long as the technical concept can be implemented by the methods through advance of the technique or other derivative techniques. Therefore, the claims cover all embodiments that may be included within the scope of the technical concept.

What is claimed is:

1. An air cleaner configured to be disposed inside a vehicle body frame, the air cleaner comprising:

an air cleaner case in which an intake chamber is formed;

an air filter disposed in the intake chamber;

an inlet tube configured to take in air to the intake chamber; and an outlet tube configured to send out the air from the intake chamber, wherein the inlet tube extends in a front-rear direction, the inlet tube has a bottom wall curved downward in a side view to form a concave curved portion below a discharge port of the inlet tube, the concave curved portion is formed with a drain hole, and wherein the inlet tube is disposed rearward of the air filter.

2. The air cleaner according to claim 1, wherein the inlet tube has an upper wall curved downward in the side view to form a convex curved portion, and the drain hole is located below the convex curved portion.

3. The air cleaner according to claim 1, wherein the drain hole is located below a center of the air filter in a height direction.

4. The air cleaner according to claim 1, wherein a suction port of the inlet tube has a lower edge located below the drain hole, and the bottom wall of the inlet tube protrudes upward between the drain hole and the lower edge of the suction port to form a convex portion.

5. The air cleaner according to claim 1, wherein
the concave curved portion is formed in a valley shape in a cross-sectional view orthogonal to an extending direction of the inlet tube, and
the drain hole is formed in a valley bottom of the concave curved portion.

6. An air cleaner configured to be disposed inside a vehicle body frame, the air cleaner comprising:
an air cleaner case in which an intake chamber is formed;
an air filter disposed in the intake chamber;
an inlet tube configured to take in air to the intake chamber; and
an outlet tube configured to send out the air from the intake chamber, wherein
the inlet tube extends in a front-rear direction,
the inlet tube has a bottom wall curved downward in a side view to form a concave curved portion below a discharge port of the inlet tube,
the concave curved portion is formed with a drain hole,
a battery is located on a lateral side of the inlet tube,
the battery is held by a battery case, and
the drain hole is covered from below by a flange on an outer edge of the battery case.

* * * * *